UNITED STATES PATENT OFFICE.

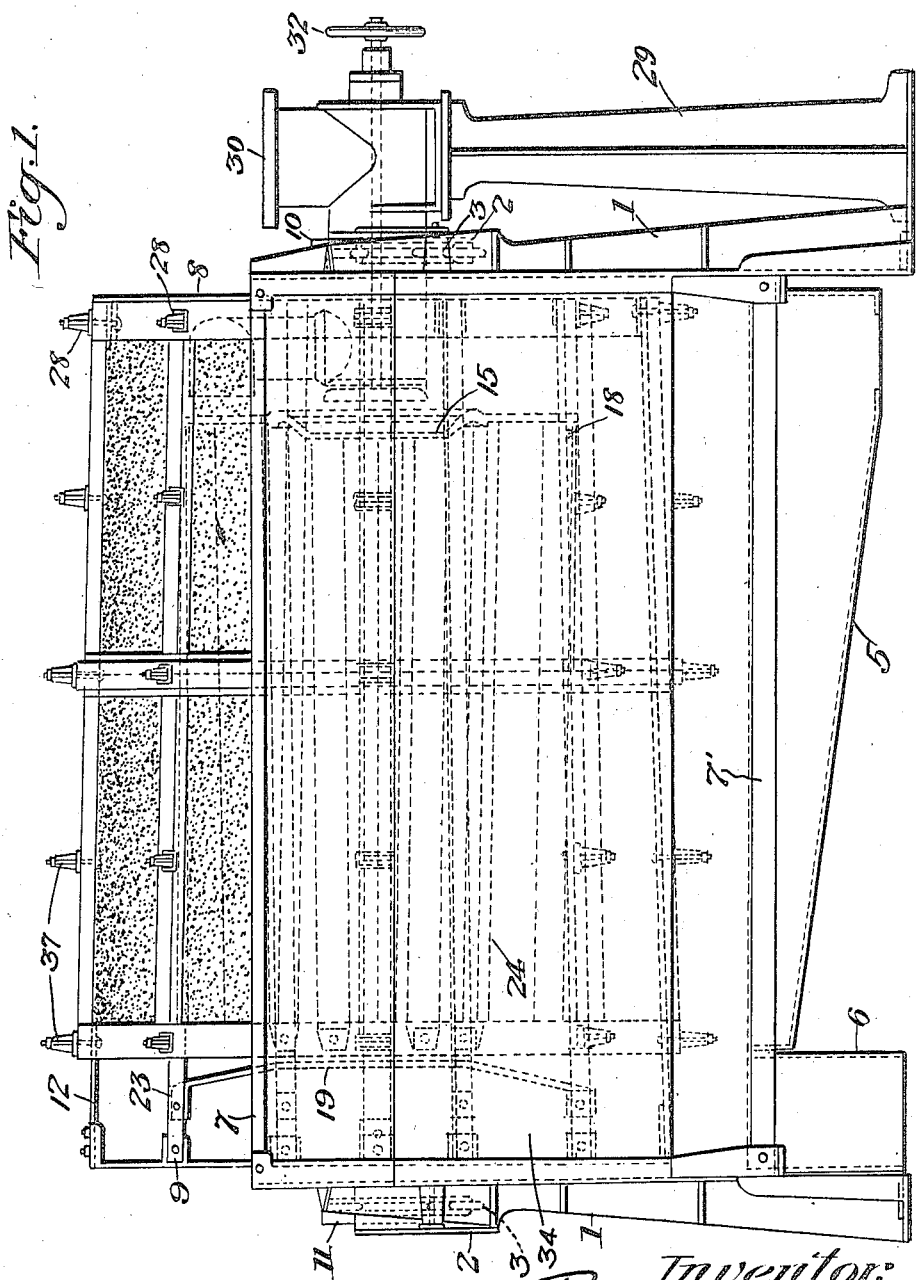

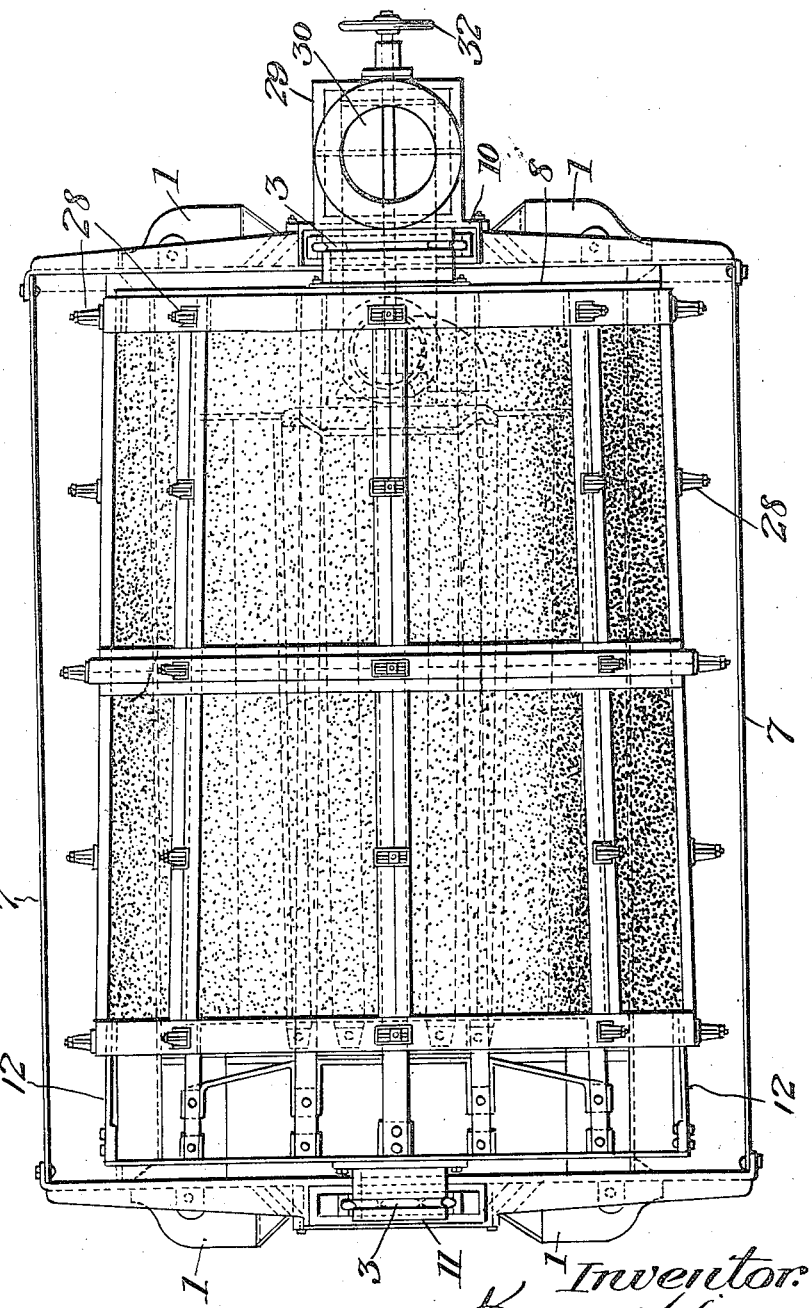

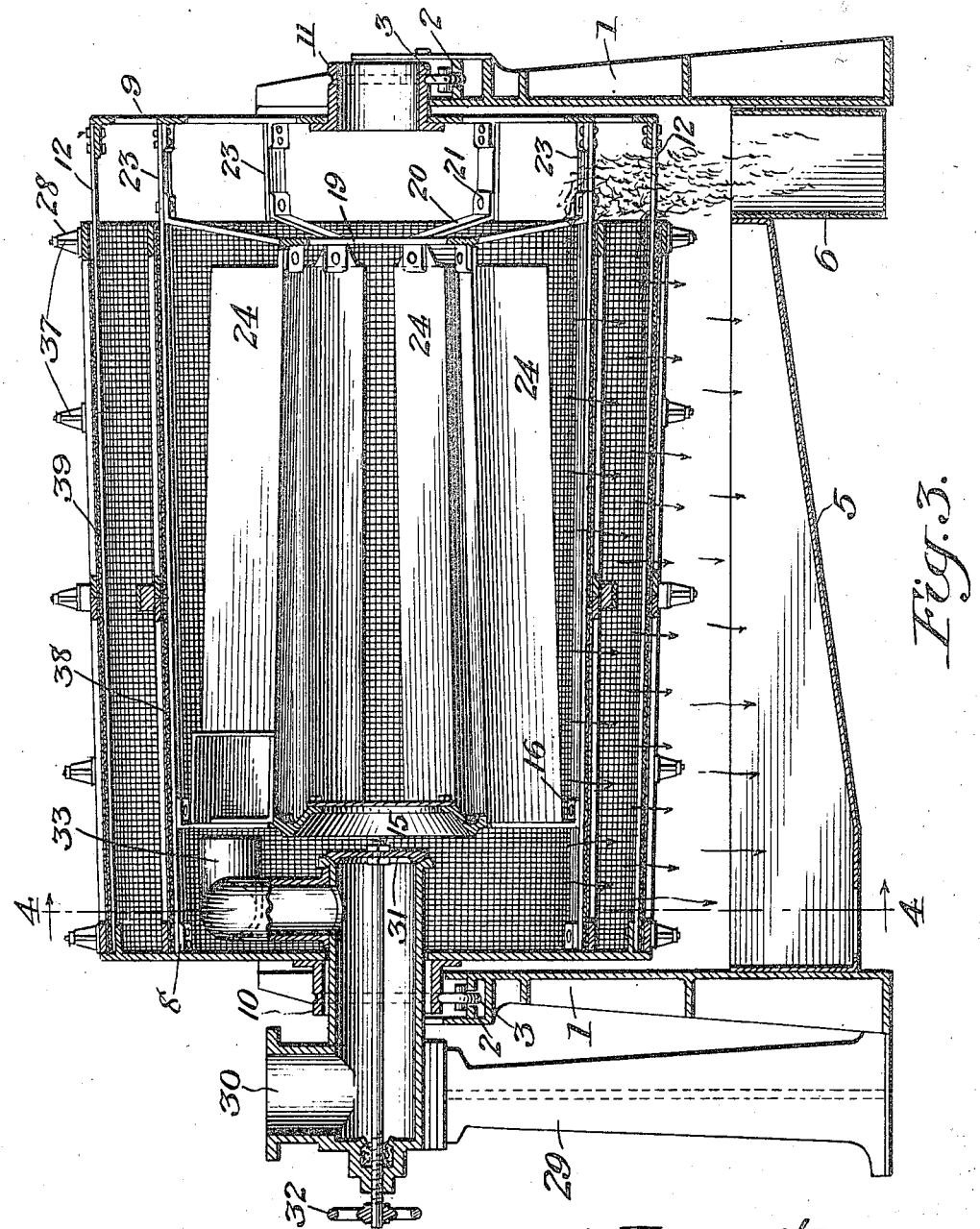

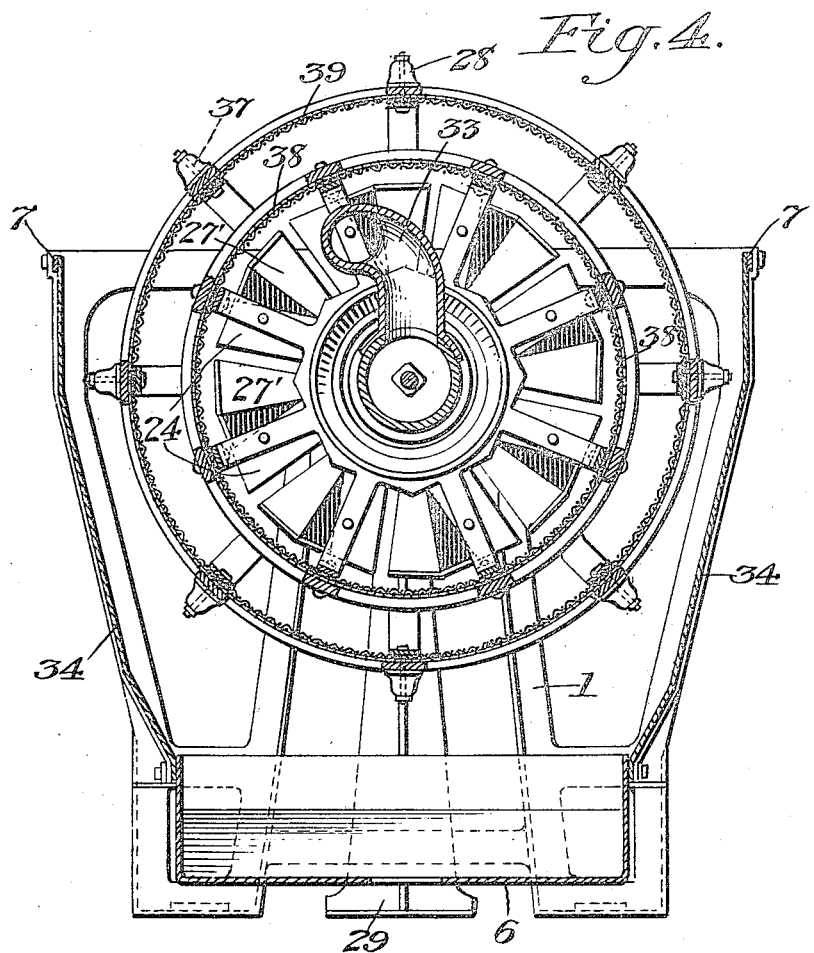
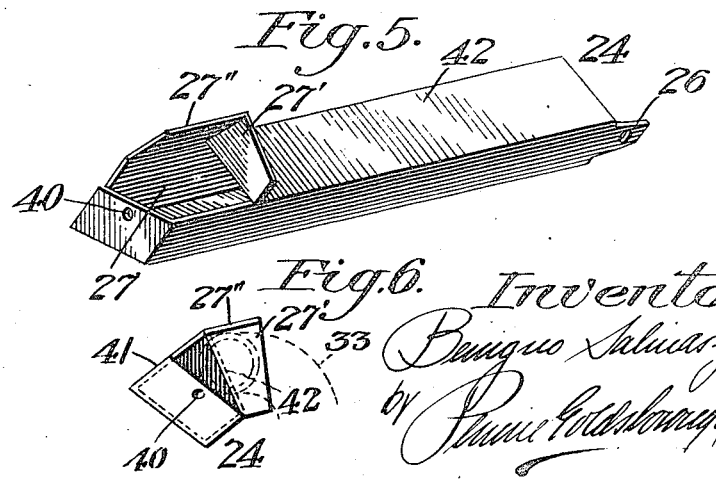

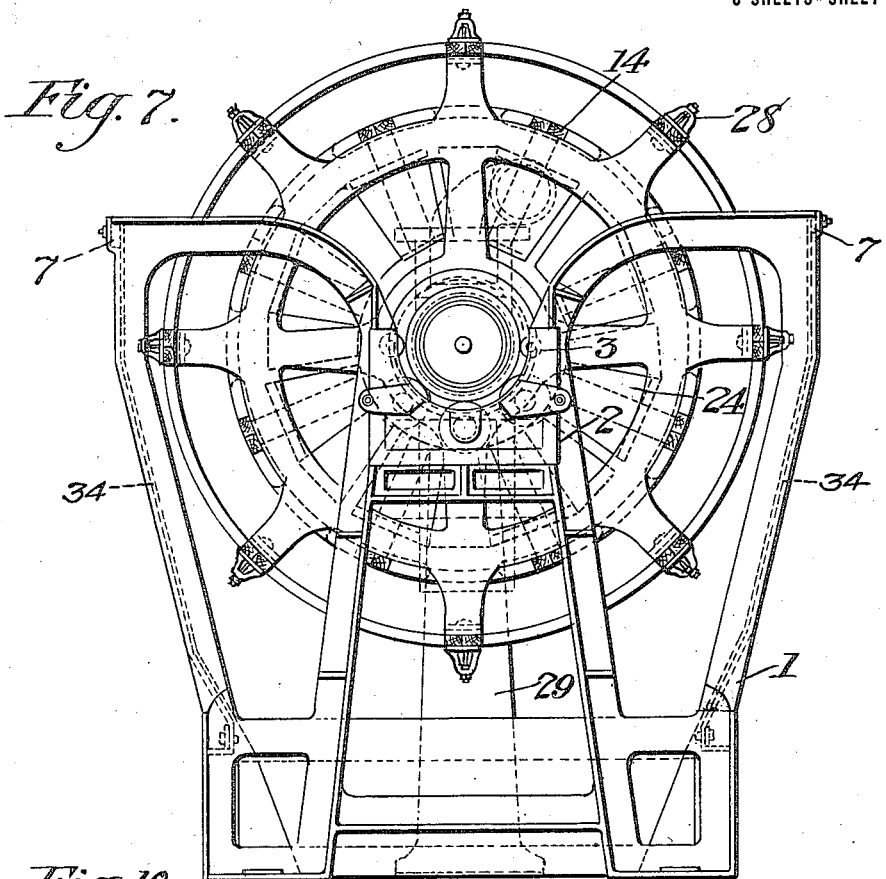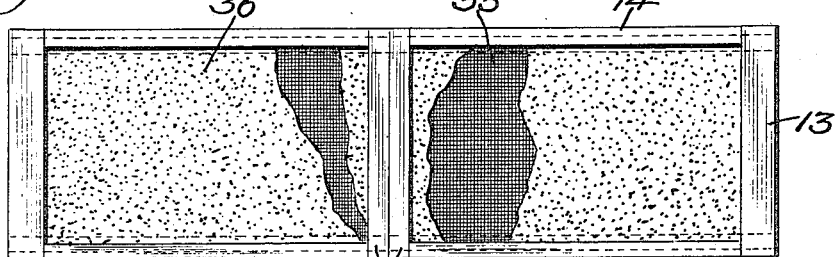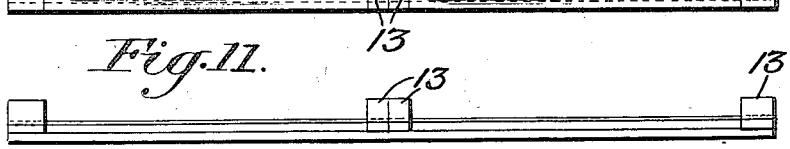

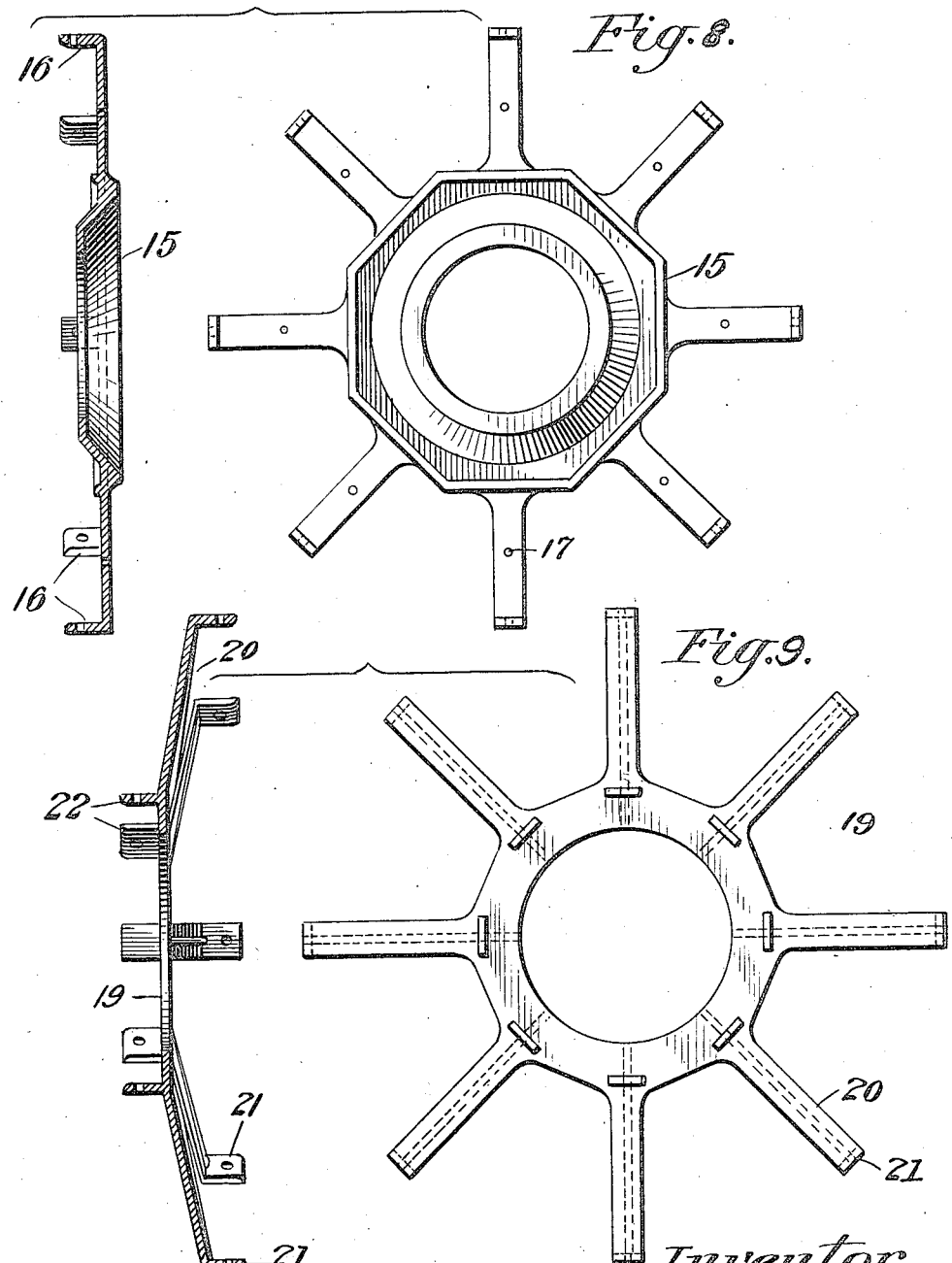

BENIGNO SALINAS Y SOUZA, OF DURAN, HABANA, CUBA, ASSIGNOR TO A. COLUMBUS SMITH, OF HABANA, CUBA.

AUTOMATIC CANE-JUICE FILTER.

1,254,160. Specification of Letters Patent. Patented Jan. 22, 1918.

Application filed March 23, 1916. Serial No. 86,283.

*To all whom it may concern:*

Be it known that I, BENIGNO SALINAS Y SOUZA, a Cuban citizen, with post-office address at Central "Julia", Duran, Province of Habana, Republic of Cuba, have invented certain new and useful Improvements in Automatic Cane-Juice Filters, application for which was filed with the Cuban Government, March 27, 1915, and granted December 2, 1915; and I do hereby declare the following to be a full, clear, and exact description of the invention, such as will enable others skilled in the art to which it appertains to make and use the same.

The present invention relates to filters for filtering sugar-cane juice and the like and has for its object to provide an improved filter having the novel features of construction and operation hereinafter set forth.

In its preferred form, the improved filter comprises at least one rotatable hollow screen in which a plurality of buckets are arranged in a circular series in such a manner that the juice or other material to be filtered may be poured into the buckets at one side of the screen to impart rotation to the screen. The rotation of the screen is due to the weight of the juice carried by the filled or partially filled buckets and to the fact that the buckets are emptied at the lower part of the cylindrical screen. The act of pouring the material to be filtered into the buckets at the upper portion of the screen by the means hereinafter described rotates the screen, and as the juice is emptied from the buckets, it passes through the screen into a trough or other receptacle positioned under the screen. The solid matter separated from the juice is discharged through the open end of the screen and may be collected in a separate trough or receptacle. The rotary motion imparted to the screen serves to agitate the solid matter retained on the inner surface of the screen and to induce the same to pass toward the discharge open end of the screen. In order to facilitate this movement of the solid matter toward such discharge open end of the screen, the latter preferably tapers so that the lower portion of the screen is inclined downwardly. Obviously, the rotary motion of the screen also serves to keep the screen clean. As will hereinafter appear, the invention contemplates the use of an additional outer co-axial screen which may be of finer mesh than the inner screen, in order to separate out the solid matter which passes through the first screen. The solid matter retained by the second screen is discharged therefrom in the same manner as described above in connection with the inner screen.

The invention is illustrated in the accompanying drawings, in which:—

Figure 1 is a side elevation of the entire apparatus;

Fig. 2 is a top plan view of the same;

Fig. 3 is a vertical longitudinal section taken through the center of the improved filter;

Fig. 4 is a transverse vertical section taken on the line 4—4 of Fig. 3;

Fig. 5 is a perspective detail view of one of the above-mentioned buckets;

Fig. 6 is an end view of one of the buckets showing the position it occupies relative to the filling pipe when the bucket is in position to receive some of the material to be filtered from said pipe;

Fig. 7 is a rear end elevation of the apparatus;

Fig. 8 shows in vertical section and front elevation, one of the spiders used at one end of the screen to which the buckets are secured;

Fig. 9 shows in vertical section and front elevation, a second spider which is positioned at the other end of the screen for supporting the buckets;

Fig. 10 is a plan view of one of the screen sections;

Fig. 11 is a side elevation of the screen section shown in Fig. 10; and

Fig. 12 is an end elevation of the screen section shown in Fig. 10.

Referring to the drawings, it will be seen that the improved filter comprises end frames 1 which are interconnected by means of upper and lower braces 7 and 7', respectively, (Figs. 1 and 2). A sheet-metal casing 34 may be supported by the skeleton framework formed by the end frames 1 and the braces 7 and 7', in order to constitute an inclosed structure within which the filter proper rotates.

The filter proper comprises the end heads 8 and 9 (Fig. 3) which are interconnected by means of an outer series of longitudinal bars 12 and an inner series of longitudinal bars 23. It will be noted that the outer bars 12 are supported upon a circular series of lugs formed on the heads 8 and 9, respectively, and the inner series of bars 23 are likewise supported upon similarly formed lugs on the heads 8 and 9. As will be clear from the drawings, the inner bars 23 are preferably positioned in staggered relation with respect to the bars 12, that is, the bars 23 do not lie directly under the bars 12.

The outer bars 12 support an outer screen 39 made up of a plurality of screen sections of the type shown in Fig. 10. Each of these sections comprises a frame made up of the transverse end members 13 and the longitudinal side members 14. The screening shown at 35 is applied to the under side of the frame formed as just described, and in order to protect the screening, a sheet of perforated metal 36 may be positioned over the same. The required number of screen sections formed in this manner are positioned upon the bars 12 and bolted thereto by means of the bolts 37 and the saddle washers 28.

The inner series of bars 23 likewise supports an inner screen. This inner screen is denoted generally by the reference character 38 and is made up of a plurality of screen sections formed in the same manner as those composing the outer screen 39.

As will hereinafter appear, one of the screens may be omitted, if so desired, but when two are employed, the outer screen should be of finer texture than the inner screen.

Secured to the inner bars 23 near the receiving end of the apparatus is a spider 18 which is shown in detail, in Fig. 8. This spider is provided with a plurality of radially-disposed arms, each of which has a bent over extremity 16 capable of being secured to one of the longitudinal bars 23. It will be understood that each of the radial arms of the spider extends toward and is connected to one of the longitudinal bars 23. A somewhat similar spider 19 (Fig. 9) is provided with a plurality of radial arms 20 which are secured to the bars 23 by means of the bent extremities 21 upon such arms.

The spiders 15 and 19 serve to support the above-mentioned buckets 24 which receive the cane juice and impart rotation to the screens. These buckets may be of any suitable shape and secured in any suitable manner to the spiders, but preferably they take the form shown in Figs. 5 and 6 and are secured at one of their ends by means of lugs 26 on the buckets to projections 22 on the spider 19. The other ends of the buckets are riveted to the radial arms of the spider 15 and for this purpose, said radial arms are provided with openings 17 and the ends of the buckets are provided with corresponding openings 40. Rivets or other fastening devices may be passed through both of these openings and the buckets thus secured to the radial arms of the spider. It will be understood that there is one projection 22 provided on the spider 19 for each bucket and that the lugs 26 of the buckets coöperate with and are secured to such projections 22.

The buckets are preferably inclosed throughout their length, except at one end, where an opening 27 is provided into which the juice is poured. The buckets are preferably of the cross-sectional shape shown in Fig. 6 and are so secured to the spiders that the broad side 41 of the buckets is located on the outside with respect to the axis of the screens. The opening 27 is, therefore, formed in one of the side walls 42, so that as the buckets come into the filling position occupied by the uppermost bucket in Fig. 3, they will be in proper relation with respect to a filling pipe 33 to have the cane juice poured into the bucket through the opening 27. The relation between the bucket and the filling pipe 33 when the bucket is in its filling position is illustrated in Fig. 6, from which it will be noted that the juice issues from the pipe 33 in a direction which is substantially longitudinal of the bucket. In order to insure proper delivery of the juice into the buckets, each bucket adjacent the opening 27 is provided with shields 27' and 27'', as shown in Fig. 5. These shields may be formed integral with the bucket as the shield 27' may constitute a bent-up portion of the wall 42 and the shield 27'' may constitute an extension of the wall 41 of the bucket. The juice is delivered into the bucket through the opening 27 in the direction indicated by the arrow in Fig. 5.

The end heads 8 and 9, the bars 12 and 23, the spiders 18 and 19, and the buckets 24 comprise a unitary structure which is rotatably mounted in the end frames 1. For this purpose, the head 8 is provided with an annular journal 10 and the head 9 is provided with a similar annular journal 11. These journals rotate upon anti-friction rolls 3 mounted in suitable bearing boxes 2. The parts are so positioned and the weight so distributed that the rotary screens, together with the parts positioned therein will rotate freely. Projecting into the head 8 through the annular journal 10 is a conduit 30 by means of which the cane juice is conducted to the filling pipe 33. It will be noted from Fig. 3 that the filling pipe 33 projects upwardly inside of the screen and terminates at such a point that as the juice is discharged from the filling pipe into the buckets, the latter will move downwardly and rotate the screens. A hand wheel 32 controls the position of a valve 31, the purpose of which will be hereinafter described.

Supported under the screens in any suitable manner is a trough or pan 5 for collecting the filtered juice. Adjacent to the pan 5 and at the discharge end of the apparatus is positioned a hopper 6 which is designed to receive the solid matter discharged through the open ends of the screens. In order to permit the solid matter to be so discharged into the hopper 6, the screens 38 and 39 do not extend completely to the head 9, as will be clear from an inspection of Fig. 3.

When the valve 31 is closed, the cane juice, or other material to be filtered, entering through the pipe 30 is discharged by means of the pipe 33 into the buckets 24 and the latter, due to the weight of the juice contained therein, cause the screens to rotate. When the buckets near the lowest point in their travel and start their upward movement at the opposite side of the screen, the juice is emptied from the buckets and the empty buckets then rise to receive another filling of the juice. The screens are, therefore, automatically rotated by the juice poured into the buckets and when the juice is emptied from the buckets, it passes through the screens 38 and 39, as indicated by the arrows in Fig. 3, into the receiving pan 5. The solid matter retained on the inner surface of the screens works its way toward the open ends of the screens and is discharged into the hopper 6, as clearly indicated in Fig. 3. Any solid matter passing through the inner screen 38 is retained by the outer screen 39 and both portions of the solid matter may be discharged into the same hopper.

If the quantity of juice entering the buckets is too great and the buckets rotate too fast, the valve 31 may be opened to permit some of the juice to pass directly downward to the bottom of the screens without entering the buckets. The flow of the juice into the buckets may, therefore, be regulated by the valve 31.

It is obvious that the rotation of the screens keeps the screening clean and serves to agitate the solid matter. In order to insure proper movement of the solid matter toward the hopper 6, the inner and outer screens may taper slightly, as clearly shown in Fig. 3, so that the lower portions of the screens will slope downwardly toward the discharge hopper 6. It will be understood that to effect this, the bars 12 and 13 supporting the screens are given the required inclination and the lugs which support these bars are positioned accordingly. Furthermore, the screen sections are constructed with due regard to the inclination given the bars 12 and 23.

It is obvious that the apparatus may be constructed in various other ways than that herein described without departing from the spirit or scope of the invention, as defined in the accompanying claims.

What I claim is:—

1. A filter comprising a hollow screen, a circular series of buckets mounted within the screen, and means to pour the material to be filtered in said buckets to rotate the screen, the buckets being designed to empty said material at the lower part of the screen, for the purpose described.

2. A filter comprising a hollow screen which is open at one end, a circular series of buckets mounted within the screen, means to pour the material to be filtered in said buckets to rotate the screen, the buckets being designed to empty said material at the lower part of the screen, means located below said screen for receiving the filtered material, and means located below and at the open end of the screen for receiving the solid matter filtered from said material.

3. A filter comprising a hollow tapering screen having a discharge opening at its largest end, a circular series of buckets mounted within the screen, means to pour the material to be filtered in said buckets to rotate the screen, the buckets being designed to empty said material at the lower part of the screen, means located under the screen for receiving the filtered material, and means so positioned as to receive the solid matter discharged through the said discharge opening.

4. A filter comprising an inner hollow screen and an outer co-axial hollow screen, both of which taper in the same direction and have discharge openings at their larger ends, a circular series of buckets mounted within the inner screen, means to pour the material to be filtered in said buckets to rotate the screens, the buckets being designed to empty said material at the lower part of the inner screen, means located below said screens for receiving the material filtered through both screens, and means so positioned as to receive the solid matter discharged through the discharge openings of both screens.

5. A filter comprising a hollow screen, a circular series of buckets mounted within the screen, a supply pipe for pouring the material to be filtered in the buckets to rotate said screen, the buckets being designed to empty said material at the lower part of the screen, and means whereby some of the material to be filtered may be passed from said supply pipe into said screen without being poured into said buckets, for the purpose described.

6. A filter comprising a casing, a hollow screen rotatably mounted in said casing, a circular series of buckets mounted within the screen, and means to pour the material to be filtered in said buckets to rotate the screen, the buckets being designed to empty said material at the lower part of the screen, for the purpose described.

7. A filter comprising a hollow screen, means for directing the material to be filtered to the interior of the screen, and means active under the influence of the weight of said material to rotate the screen.

8. A filter comprising a hollow screen which is open at one end, means to pour the material to be filtered into said screen, means for receiving said material to rotate the screen, means below the screen for receiving the filtered material, and means located adjacent to the open end of the screen for receiving the solid matter filtered from said material.

9. A filter comprising a hollow tapering screen rotatable on a horizontal axis having a discharge opening at its largest end, means for directing the material to be filtered into said screen, means carried by the screen for receiving the material to rotate the screen by the weight of the material, and means for receiving the filtered material from the screen.

10. A filter comprising an inner hollow screen and an outer coaxial hollow screen both of which are rotatable on a horizontal axis, taper in the same direction and have discharge openings at their larger ends, means for directing the material to be filtered into the inner hollow screen, means for receiving the material from said directing means to cause the rotation of the screens, and means for receiving the filtered material as it passes from the outermost screen.

11. A filter comprising a hollow horizontally disposed rotatable screen, means for directing the material to be filtered into the screen at one end thereof, means operated by the weight of said material for rotating the screen, the said screen having its lower part inclined downwardly away from the aforementioned material - directing means, means for receiving the juice from the screen throughout its length, and means for receiving the solid matter from the end of the screen.

12. In a filter, the combination with a hollow rotatable screen, of means for directing the material to be filtered into said screen, means operated by the weight of the material to rotate the screen, and means for permitting the flow of a portion of the material into said screen independent of the rotating means.

13. The self-rotating screen comprising a frame covered with screen material and revolubly mounted to have an inclined lower portion arranged to discharge the more solid material adjacent the lower open discharge end of the screen, liquor supply means to supply liquor to the inside of said screen at its receiving end remote from its discharge end and substantially closed operating buckets mounted on said screen frame to coöperate with said liquor supply means and to receive liquor while in an inclined position and to cause the rotation of said screen, said buckets automatically discharging the liquor adjacent the receiving end of said screen when said buckets are adjacent their lowest position.

14. The self-rotating screen comprising a frame covered with screen material and revolubly mounted to have an inclined lower portion arranged to discharge the more solid material adjacent the lower open discharge end of the screen, liquor supply means to supply liquor to the inside of said screen remote from its discharge end and operating buckets mounted on said screen to coöperate with said liquor supply means and to receive liquor while in an inclined position and cause the rotation of said screen, said buckets automatically discharging the liquor adjacent the receiving end of said screen when said buckets are adjacent their lowest position.

15. The self-rotating screen comprising a frame covered with screen material and revolubly mounted to have an inclined lower portion arranged to discharge the more solid material adjacent the lower discharge end of the screen, liquor supply means to supply liquor to the inside of said screen remote from its discharge end and operating buckets mounted on said screen to coöperate with said liquor supply means and to cause the rotation of said screen.

16. The self-rotating screen comprising a frame provided with screen material and revolubly mounted to discharge the more solid material adjacent the discharge end of the screen, liquor supply means to supply liquor to the inside of said screen remote from its discharge end and operating buckets mounted on said screen to coöperate with said liquor supply means and to cause the rotation of said screen.

17. The self-rotating screen comprising a conical frame covered with screen material and revolubly mounted to have an inclined lower portion arranged to discharge the more solid material adjacent the lower discharge end of the screen, means to supply liquor to the inside of said screen at its receiving end opposite to its discharge end, and operating buckets mounted on said screen to coöperate with said liquor supply means and to receive liquor and cause the rotation of said screen, said buckets automatically discharging the liquor adjacent the receiving end of said screen.

18. The self-rotating screen comprising a conical frame covered with screen material and revolubly mounted to discharge the more solid material adjacent the lower discharge end of the screen, means to supply liquor to the inside of said screen and operating buckets mounted on said screen to coöperate with said liquor supply means and to receive liquor and cause the rotation of said screen.

In testimony whereof I affix my signature.

BENIGNO SALINAS y SOUZA.